United States Patent
Basso et al.

(10) Patent No.: US 10,834,008 B2
(45) Date of Patent: *Nov. 10, 2020

(54) ARBITRATION OF MULTIPLE-THOUSANDS OF FLOWS FOR CONVERGENCE ENHANCED ETHERNET

(71) Applicant: International Business Machines Corporation, Armonk, NY (US)

(72) Inventors: Claude Basso, Nice (FR); Nikolaos Chrysos, Thalwil (CH); Casimer M. DeCusatis, Poughkeepsie, NY (US); Mircea Gusat, Langnau (CH); Keshav G. Kamble, Fremont, CA (US); Cyriel J. Minkenberg, Gutenswil (CH); Fredy D. Neeser, Langnau Am Albis (CH); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/807,463

(22) Filed: Nov. 8, 2017

(65) Prior Publication Data

US 2018/0069802 A1 Mar. 8, 2018

Related U.S. Application Data

(63) Continuation of application No. 14/876,528, filed on Oct. 6, 2015, now Pat. No. 9,843,529, which is a
(Continued)

(51) Int. Cl.
*H04L 12/873* (2013.01)
*H04L 12/863* (2013.01)

(52) U.S. Cl.
CPC .......... *H04L 47/527* (2013.01); *H04L 47/521* (2013.01); *H04L 47/6295* (2013.01)

(58) Field of Classification Search
CPC .. H04L 47/527; H04L 47/521; H04L 47/6295
See application file for complete search history.

(56) References Cited

U.S. PATENT DOCUMENTS

| | | | |
|---|---|---|---|
| 6,570,883 B1 * | 5/2003 | Wong | H04L 12/5602 370/232 |
| 9,210,095 B2 | 12/2015 | Basso et al. | |

(Continued)

FOREIGN PATENT DOCUMENTS

| | | |
|---|---|---|
| CN | 101714947 A | 5/2010 |
| WO | 2009150613 A1 | 12/2009 |

OTHER PUBLICATIONS

International Search Report and Written Opinion from PCT Application No. PCT/IB2013/060808, dated May 16, 2014.

(Continued)

*Primary Examiner* — Jianye Wu
(74) *Attorney, Agent, or Firm* — Zilka-Kotab, P.C.

(57) ABSTRACT

In one embodiment, a method includes receiving a plurality of flows, each flow comprising packets of data and assigning a service credit to each of the plurality of flows. In addition, the method includes assigning a weight parameter to each of the plurality of flows, and selecting a flow from a head of a first control queue unless the first control queue is empty or there is indication that the first control queue should be avoided. A flow is selected from a head of a second control queue in response to a determination that the first control queue is empty or there is indication that the first control queue should be avoided. Additionally, the method includes providing a number of units of service to the selected flow. Moreover, the method includes decreasing the selected flow's service credit by an amount corresponding to the number of units of service provided thereto.

11 Claims, 6 Drawing Sheets

Related U.S. Application Data continuation of application No. 13/747,357, filed on Jan. 22, 2013, now Pat. No. 9,210,095.

(56) References Cited

U.S. PATENT DOCUMENTS

| | | | |
|---|---|---|---|
| 9,843,529 B2 | 12/2017 | Basso et al. | |
| 2004/0013089 A1* | 1/2004 | Taneja | H04L 47/14 370/235 |
| 2006/0187949 A1* | 8/2006 | Seshan | H04L 47/527 370/412 |
| 2007/0121504 A1* | 5/2007 | Hellenthal | H04L 47/10 370/230 |
| 2009/0003209 A1* | 1/2009 | Kalkunte | H04L 47/10 370/232 |
| 2014/0204748 A1 | 7/2014 | Basso et al. | |
| 2016/0028643 A1 | 1/2016 | Basso et al. | |

OTHER PUBLICATIONS

Basso et al., U.S. Appl. No. 13/747,357, filed Jan. 22, 2013.
Non-Final Office Action from U.S. Appl. No. 13/747,357, dated Aug. 8, 2014.
Final Office Action from U.S. Appl. No. 13/747,357, dated Nov. 20, 2014.
Advisory Action from U.S. Appl. No. 13/747,357, dated Feb. 2, 2015.
Notice of Allowance from U.S. Appl. No. 13/747,357, dated Mar. 26, 2015.
Non-Final Office Action from U.S. Appl. No. 13/747,357, dated Jun. 15, 2015.
Shreedhar et al., "Efficient Fiar Queuing Using Deficit Round-Robin," IEEE/ACM Transactions On Networking, vol. 4, No. 3, Jun. 1996, pp. 375-385.
Notice of Allowance from U.S. Appl. No. 13/747,357, dated Aug. 3, 2015.
Basso et al., U.S. Appl. No. 14/876,528, filed Oct. 6, 2015.
Non-Final Office Action from U.S. Appl. No. 14/876,528, dated Apr. 22, 2016.
Final Office Action from U.S. Appl. No. 14/876,528, dated Aug. 29, 2016.
Advisory Action from U.S. Appl. No. 14/876,528, dated Jan. 6, 2017.
Non-Final Office Action from U.S. Appl. No. 14/876,528, dated May 8, 2017.
Notice of Allowance from U.S. Appl. No. 14/876,528, Aug. 7, 2017.

* cited by examiner

ARBITRATION OF MULTIPLE-THOUSANDS OF FLOWS FOR CONVERGENCE ENHANCED ETHERNET

BACKGROUND

The present invention relates to data center infrastructure and operation, and more particularly, this invention relates to arbitrating multiple-thousands of flows at 100 G speed and faster. Current data centers include many thousands of digital appliances, each digital appliance being capable of processing and storing massive amounts of data. When seen in isolation, these appliances are not always superior to what users may have at home. However, the confinement of many of these digital appliances within a small physical area, and the large-data application that they can collectively engage into, makes data centers particularly interesting.

Data center networks are playing a critical compounding function in data centers. In a somewhat still turbulent field, there have been many recent proposals to reshape current data center networks so that they are more capable of successfully contending with stringent, and in some cases even divergent, requirements. Many of these proposals focus on management, transport, or network level protocols, targeting better exploitation of the existing infrastructure by the applications of data center tenants.

Figure 3:
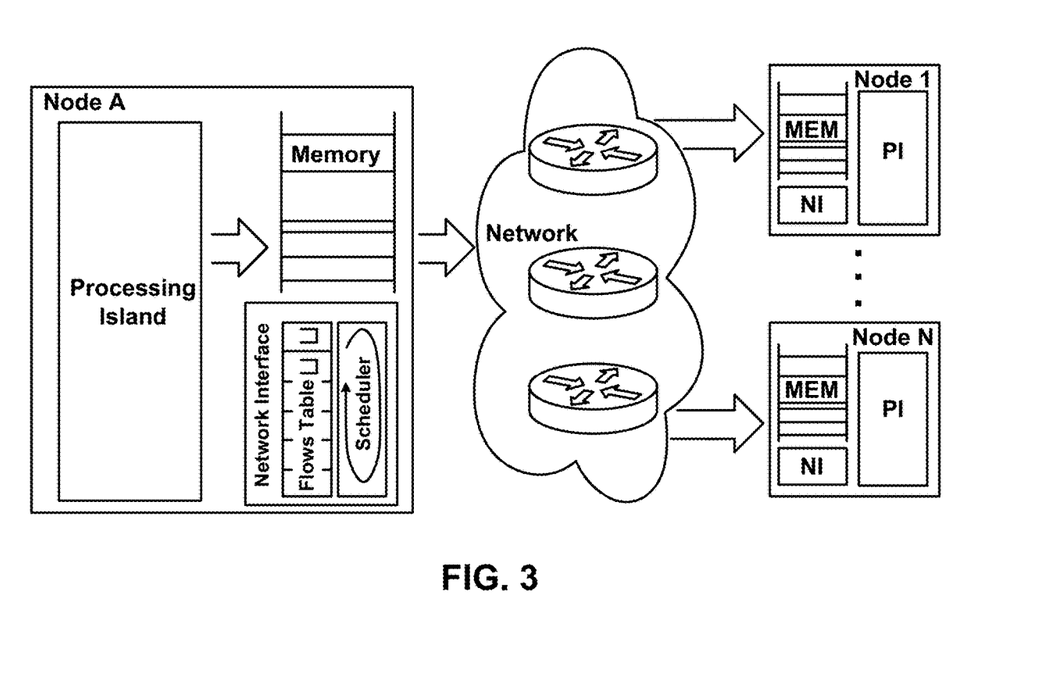
FIG. 3 is a simplified diagram showing the complexity of scheduling in a network interface, according to one embodiment.

At the same time, the hardware of a typical data center network has also changed in ways that may radically modify the landscape. Intelligent network interfaces attached to (or coexisting with) processing cores, which are capable of providing low-latency and/or high-bandwidth pathways to remote processes, has been a long sought goal in data center infrastructure development. FIG. 3 shows an illustration of scheduling in a network interface, based on urgency, a connection's window, a tenant's subscription, and/or other applicable criteria.

Figure 4:
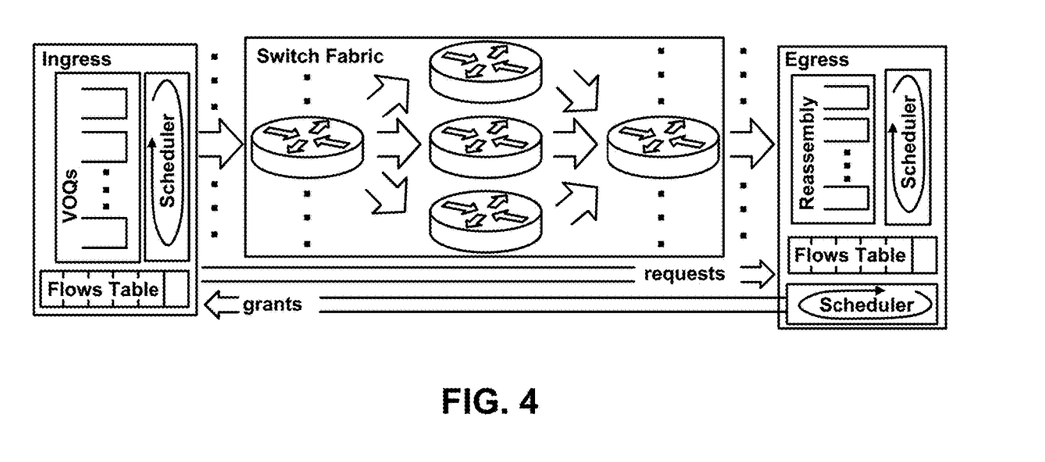
FIG. 4 is a simplified diagram showing the complexity of scheduling in a large switching fabric, according to one embodiment.

In addition, large switching fabrics that utilize convergence enhanced Ethernet that are capable of providing homogeneous quality-of-service guarantees, are able to seamlessly unify large numbers of distributed resources. The scheduling issues which arise due to the complexity of the network are shown in FIG. 4. These types of large, complex switching fabrics are another anticipated step forward to address the issues with conventional data center networks.

Switches and network interfaces with 40 G Ethernet ports are now becoming available, while the industry is preparing for 100 G Ethernet capability. Lessons learned from years of data center usage and construction indicate that bandwidth is rarely in excess. Although there are probably only a few processes today that are capable of saturating a 100 G port or link, this may not be the case in the near future. In addition, in a multi-virtual machine (VM), multi-tenant data center environment, any link may easily become congested. Thus, it is traditionally agreed upon that the network should be able to slice its capacity in order to enable isolated, well-secured services to users, a notion that is even more applicable in current data centers and those of the future.

However, scheduling becomes extremely challenging with increased network size and line speed. For example, the time needed for a 64 B Ethernet frame to be processed on a 100 G line is just 6.6 ns, which means that decisions on where and how to process flows need to be made extremely quickly in order to manage the bandwidth effectively. At the same time, in data center and warehouse scale computers, the number of requestors that a scheduler may be required to arbitrate requests from may range in magnitude from a few tens (e.g., in a small scale switch) up to several tens of thousands or more (e.g., in a large switching fabric or in large network interfacing).

To accommodate many different flows, conventional systems have made use of algorithms which are adapted to determine which flow has priority over other flows provided to the system based on service-weights of the individual flows. The priority flows are processed first, while the lower prioritized flows wait in queue. One of the problems with this conventional scheduling is that this allocation of bandwidth results in bursts of the priority flows being processed, followed by another flow, then another, and the resulting allocation contains a series of bursts of various flows, which is undesirable.

SUMMARY

In one embodiment, a system includes a processor and logic integrated with the processor, executable by the processor, or integrated with and executable by the processor. The logic is configured to cause the processor to select a flow from a head of a first control queue or a second control queue. The logic also causes the processor to provide service to the selected flow. Moreover, the logic causes the processor to decrease a service credit of the selected flow by an amount corresponding to an amount of service provided to the selected flow.

In another embodiment, a computer program product includes a computer readable storage medium having program code embodied therewith. The computer readable storage medium is not a transitory signal per se. Also, the embodied program code is readable/executable by a device to receive a plurality of flows, each flow comprising packets of data. The embodied program code is also readable/executable by the device to assign a service credit to each of the plurality of flows. In addition, the embodied program code is readable/executable by the device to assign a weight parameter to each of the plurality of flows. Additionally, the embodied program code is readable/executable by the device to select a flow from a head of a first control queue unless the first control queue is empty or there is indication that the first control queue should be avoided. A flow is selected from a head of a second control queue in response to a determination that the first control queue is empty or there is indication that the first control queue should be avoided. Also, the embodied program code is readable/executable by the device to provide a number of units of service to the selected flow. Moreover, the embodied program code is readable/executable by the device to decrease the selected flow's service credit by an amount corresponding to the number of units of service provided thereto.

In accordance with another embodiment, a method includes receiving a plurality of flows, each flow comprising packets of data. The method also includes assigning a service credit to each of the plurality of flows. In addition, the method includes assigning a weight parameter to each of the plurality of flows. Also, the method includes selecting a flow from a head of a first control queue unless the first control queue is empty or there is indication that the first control queue should be avoided. A flow is selected from a head of a second control queue in response to a determination that the first control queue is empty or there is indication that the first control queue should be avoided. Additionally, the method includes providing a number of units of service to the selected flow. Moreover, the method includes decreasing the selected flow's service credit by an amount corresponding to the number of units of service provided thereto.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a system includes a processor and logic integrated with and/or executable by the processor, the logic being adapted to: receive a plurality of flows, each flow comprising packets of data, assign a service credit to each of the plurality of flows, assign a weight parameter to each of the plurality of flows, select a flow from a head of a first control queue unless the first control queue is empty or there is indication that the first control queue should be avoided, wherein a flow is selected from a head of a second control queue when the first control queue is empty or there is indication that the first control queue should be avoided, provide a number of units of service to the selected flow, and decrease the selected flow's service credit by an amount corresponding to the number of units of service provided thereto.

In another general embodiment, a method for scheduling service for flows includes selecting a flow from a head of a first control queue unless the first control queue is empty or there is indication that the first control queue should be avoided, wherein a flow is selected from a head of a second control queue when the first control queue is empty or there is indication that the first control queue should be avoided, providing a number of units of service to the selected flow, and decreasing the selected flow's service credit by an amount corresponding to the number of units of service provided thereto.

In yet another general embodiment, a computer program product for scheduling service for flows includes a computer readable storage medium having program code embodied therewith, the program code readable/executable by a device to: select a flow from a head of a first control queue unless the first control queue is empty or there is indication that the first control queue should be avoided, wherein a flow is selected from a head of a second control queue when the first control queue is empty or there is indication that the first control queue should be avoided, provide a number of units of service to the selected flow, and decrease the selected flow's service credit by an amount corresponding to the number of units of service provided thereto.

According to yet another general embodiment, a system for scheduling servicing for flows includes a processor and logic integrated with and/or executable by the processor, the logic being adapted to: receive a plurality of flows, each flow comprising packets of data, assign a service credit to each of the plurality of flows, assign a weight parameter to each of the plurality of flows, place the plurality of flows into the second control queue initially according to an order in which each of the flows is received, select a flow from a head of a first control queue unless the first control queue is empty or there is indication that the first control queue should be avoided, wherein a flow is selected from a head of a second control queue when the first control queue is empty or there is indication that the first control queue should be avoided, decrease the selected flow's service credit by an amount corresponding to a number of units of service provided to the selected flow when the selected flow is taken from the first control queue, and increase the selected flow's service credit by an amount corresponding to the selected flow's weight parameter when the selected flow is taken from the second control queue.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of a non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
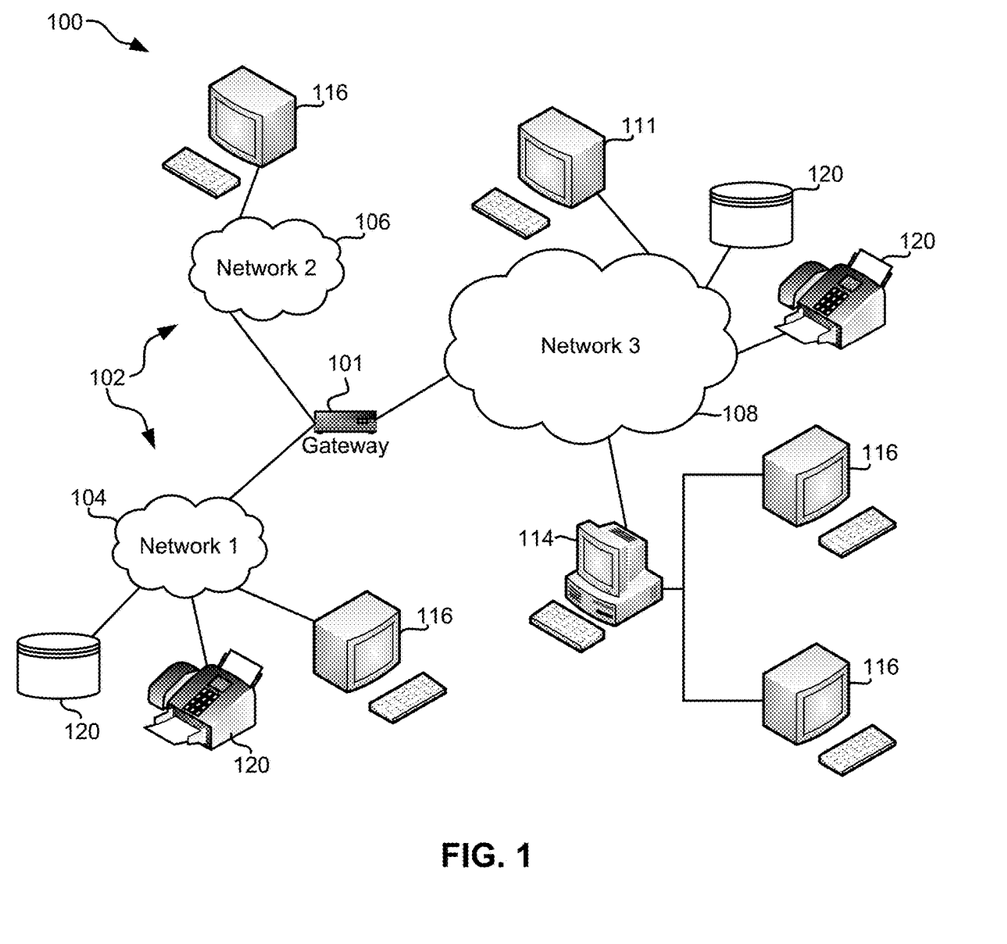
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
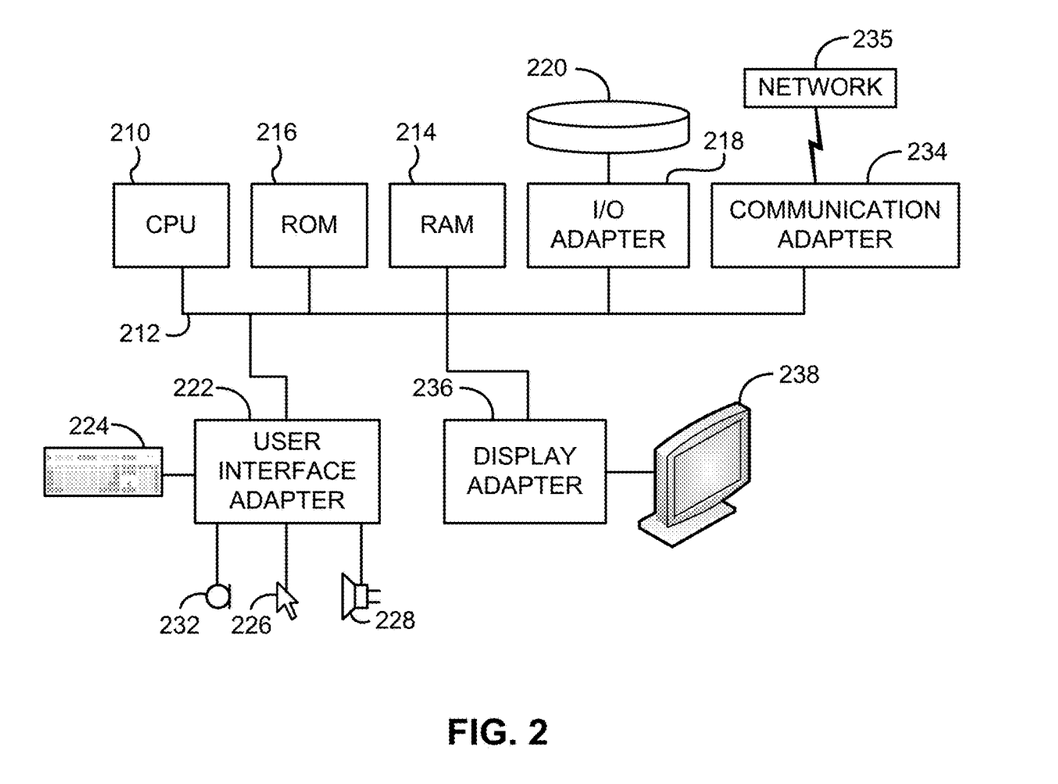
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a processor 210, such as a microprocessor, a central processing unit (CPU), microcircuit or microchip, field programmable gate array (FPGA), integrated circuit (IC), application specific integrated circuit (ASIC), etc., and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to one embodiment, a packet scheduling module for use in switches, routers, servers, and any other suitable hardware environments, includes an algorithm scheme that scales to an arbitrary number of requestors and provides ultra-fast line rates. Packet schedulers have been studied extensively since the beginning of the asynchronous transfer mode (ATM) switching chip.

The simplicity versus efficiency trade-offs of the deficit round-robin (DRR) introduced in the mid 1990s have rendered it the algorithm of choice in many operating systems and network devices. Alternative schemes have been proposed since the introduction of DRR, which maintain the same O(1) asymptotic complexity of DRR while providing smoother service. However, these DRR alternatives introduce non-negligible complexity, and consume valuable silicon area (considering that a modern ASIC may accommodate multiple links and schedulers), which may otherwise be expended on other functionally critical units.

The proposed algorithm is an advancement when compared to DRR. Some aspects of the proposed algorithm include: (i) preservation of the simplicity of the original DRR algorithm; (ii) smoothing out the inherent burstiness of the original DRR algorithm, especially when weights of active flows are similar to one another; and (iii) provably providing weight-proportional fair service.

Fast fair packet scheduling is a goal of any packet scheduling algorithm. In packet-switched networks, distributed packet schedulers are commonly responsible for slicing up the available bandwidth. Weighted round-robin is a flexible scheduling scheme that extends the round-robin service by prioritizing requests using service-weights. One can preconfigure or dynamically change weights to requestors, so that each weight assignment represents either the minimum bandwidth share (e.g., weights sum up to exactly 100) of each flow, or the relative urgency and/or importance of one request over the other. It is assumed that flows are simply groups of requests. Each flow may present its demand to a processor as a queue of unprocessed data packets, as a request counter of unprocessed data units, or any other suitable way. The possibility of two or more flows being merged in a common queue or counter is disregarded for the sake of this discussion.

The scheduler keeps in memory a configurable weight parameter $w_f \in N^+$ and a service-credit $cr_f$ counter for each flow. A descriptor of any eligible flow may be present in one of two control queues, which are referred to herein as highQ and lowQ, however a division between the queues may be made, and the queues may have any name capable of allowing the queues to be differentiated from one another.

Referring to Algorithm 1 shown below, at any time, the scheduler selects the flow f at the head of one of these control queues, giving strict priority to highQ whenever this queue is non-empty. Note that the selected flow f is always removed from the corresponding control queue once it is selected. Assume that the selected flow f is assigned L units of service, where L may correspond to any value capable of measuring an amount of service provided, such as a number of bytes of a head-of-line (HOL) packet, an amount of buffer units, etc. In addition, the amount of service provided, L, may vary depending on the priority of the flow being serviced, the type of packets being serviced, or any other factor. Additionally, L may be greater or less for each round of servicing, in order to achieve any desired flow characteristics.

Next, the scheduler performs one or more of the following next steps: (a) decrements $cr_f$ by L; and (b) increments $cr_f$ by $w_f$ when flow f was dequeued from queue lowQ. When flow f is still eligible to be processed after receiving this service, or when flow f becomes eligible after an inactivity period, the scheduler may insert flow f at the end of queue lowQ only when $cr_f \leq 0$, and otherwise, the scheduler may insert flow f at the end of queue highQ.

---

Algorithm 1: Main Scheduling Algorithm

---

```
Init: ∀f, cr_f = 0;
Select next flow:
    f = null; selectedLowQ = false;
    if highQ.empty = true then
        if lowQ.empty = false then
            f = lowQ.dequeue( );
            selectedLowQ = true;
        end if
    else
        f = highQ.dequeue( );
    end if
    if f ≠ null then
        cr_f = cr_f − L;
        if selectedLowQ = true then
            cr_f = cr_f + w_f;
        end if
        Serve L units from flow f
        Reprogram flow (f)
    end if
Reprogram flow (g):
    if g is eligible then
        if cr_g > 0; then
            highQ.enqueue(g);
        else
            lowQ.enqueue(g);
        end if
    end if
```

---

Note that by constraining $w_f \geq L_{max}$, a flow's service credit is prevented from dropping too far below zero (which avoids some associated problems with flow handling), hence $cr_f \in (-L_{max}, w_f)$. Here, $L_{max}$ is the largest occurrence of the amount of service provided, L, for any instance of a flow being selected and serviced. For example, if L is measured in bytes, each time a flow is selected, one frame from the flow is serviced, and the maximum frame size is 1522 bytes. Therefore, in this case, since the maximum service provided at any one time is one frame, $L_{max} = 1522$ bytes.

Note also that if only one control queue is used, then the service would be RR (that is to say, after being served, a flow would be assigned the lowest priority among all other eligible flows). Obviously, such a scheme would not be fair if packets have variable size, and flow weights would not have any effect on packet processing. By having two queues: a lowQ and a highQ, Algorithm 1 maintains weighted fairness, independent of the per-flow packet size distributions. This advantage is described with the following example.

Consider the following example where a time interval $(t_1, t_2)$ during which flows $(f_1, \ldots, f_N)$ are continuously active, i.e., eligible for service. Additionally, assume that all flows start with $cr_f=0$, and are initially present in queue lowQ and that all packets in the system are L bytes long. Furthermore, assume that initially $f_i$ is at the head of queue lowQ, and thus the scheduler selects it first and serves its HOL packet. The scheduler will then increment $cr_{fi}$ by $(w_{fi}-L)$. The updated $cr_{fi}$ will be positive if $w_{fi}>L$, in which case the scheduler will enqueue flow $f_i$ in queue highQ. Since flow $f_i$ would be the only flow in queue highQ, e.g., it would be alone in queue highQ, flow $f_i$ will be selected for an additional number of times equal to $k_{fi}-1$ times, sending one packet each time, where $$k_{fi} = \left\lfloor \frac{w_{fi}}{L} \right\rfloor.$$

Eventually, $cr_{fi}=w_{fi}-k_{fi}\cdot L \leq 0$, and the scheduler will enqueue flow $f_i$ at the end of queue lowQ. Next, the scheduler will select the new head of queue lowQ, flow $f_j$, and will similarly serve this flow for $k_{fj}$ times, until $cr_{fj}=w_{fj}-k_{fj}\cdot L \leq 0$.

Let a visit include all the service assigned to flow f contiguously in time. The trivial case where flow f is the only flow and is served persistently is ignored in this example. Also, denote by round a segment in the execution of the algorithm that visits each active flow exactly once. From the discussion above, it then follows that in the first round each flow received service roughly proportional to its weight. If a flow received more service (e.g., 70) than what its weight allows (50), it will end up with a negative service credit (−20), which will be amortized by giving the flow less service in the next round. Thus, if the service given to an active flow f when the arbiter visits it for the $m^{th}$ time is denoted by $s_f(m)$, and $cr_f(m)$ denotes the service credit after the $m^{th}$ visit, then it can be seen that $s_f(m)=w_f+cr_f(m-1)-cr_f(m)$. By letting $S(t_1, t_2)=\Sigma_{i=1}^{m}s_f(i)$, and noting that $-L_{max}<c_{rf}<w_f$, it may be proven that in any interval $(t_1, t_2)$ at which all flows in the system are active, and flow f is visited m times, the aggregate service assigned to f will be $(m-1)\cdot w_f - L_{max} < s_f(t_1, t_2) < (m+1)\cdot w_f + L_{max}$.

The proposed scheme differs from DRR because, in the case when a set of flows have positive weights and are all active at the same time, the proposed scheme will serve one packet from each in a round robin (RR) fashion. Hence, it contrasts with DRR, which will serve the selected flow in a burst until its service credit is exhausted, or the next packet is larger than the selected flow's service credit. Additionally, DRR avoids serving a packet when service would not be accommodated by the current service credit of the flow. This method of serving the packets might leave a flow with up to $L_{max}-1$ service credits (surplus) left for the next round.

The proposed scheme, on the other hand, serves a flow even if the flow's service credit is not sufficient for its next packet, and this may create a debit (negative service credit) of up to $L_{max}-1$. Nevertheless, for a time interval in which the set of active flows does not change, the proposed scheme (and accompanying Algorithm 2, shown below) has fairness similar to DRR. Given that each flows' eligibility state does not change, the highQ will include at most one flow. Of course, this relationship is easily inferred by the algorithm description. It then also follows that the algorithm visits flows in a RR fashion, much like in DRR. That is, between any two visits to flow $f_i$, all the other active flows will have received one visit. Thus, all active flows are visited the same number of times, plus or minus one (±1). Then, it follows that in the long term, the service given to each flow will be proportional to the weight of the flow, and independent of the per-flow packet size distribution.

It is a benefit of a scheduling algorithm to be able to take priorities in stride. In any execution of DRR, and for any pair of flows that are active in $(t_1, t_2)$: $s_{f1}(t_1, t_2)/w_{f1} - s_{f2}(t_1, t_2)/w_{f2} \leq C$, where C is a constant with respect to a number of flows and depends on $L_{max}$. The same inequality holds true for Algorithm 1, when the set of active flows does not change in $(t_1, t_2)$. From the above calculation, a constant upper bound for the difference between the normalized services received by any flow pair may be set. The ideal, fluid generalized processor sharing (GPS) scheduler yields continuously equal normalized services to active flows. However, in practice, constant C may be large enough to hurt the performance of the scheduler.

Consider, for example, that three flows, $f_1$, $f_2$, and g, with weights $wf_1=wf_2=100 \cdot L_{max}$, and $w_g=L_{max}$ are configured. The intention is to treat flows $f_1$ and $f_2$ equally, but if either of the flows $f_1$ and $f_2$ competes with flow g, it should get 100× more service due to their respective weighting. If flows $f_1$ and $f_2$ are active while flow g is not, then both Algorithm 1 and DRR will serve $\approx(100 \cdot L_{max})$ bytes from each flow in turn, thus leading to burstiness. To make matters worse, a large maximum transmission unit (MTU) may elicit an increase of the weights and therefore of service burstiness.

Figure 5:
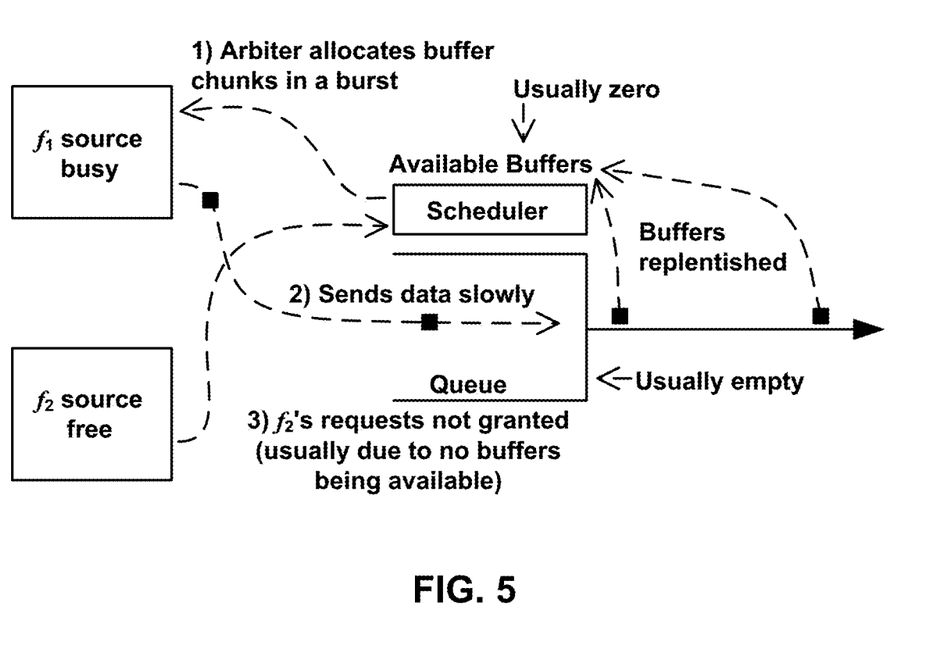
FIG. 5 shows a scheduler that allocates buffers of a destination queue, according to one embodiment.

Burstiness is traditionally undesired in packet switched networks. In FIG. 5, a scheduler that allocates buffers of a (flow-controlled) destination queue is depicted as an example. The scheduler first visits flow $f_1$, because flow $f_2$ presented its requests a couple of clock cycles later than flow $f_1$. If the scheduler is too bursty, then, before giving a first chance to flow $f_2$, there may be no more buffers available. Effectively, flow $f_2$ must wait for flow $f_1$ to replenish some buffers. If flow $f_1$ is bottlenecked and does not forward the granted data fast enough, the queue can underflow.

According to one embodiment, and with reference to Algorithm 2, the issues associated with conventional schedulers may be avoided, reduced, and/or eliminated. For example, the smoothness (or short-term fairness) of the scheduler may be improved under such practical cases, when flows have approximately equal but relatively large weights. One goal of the proposed scheduler is to prevent one flow from monopolizing queue highQ for a respectively long time.

In particular, assume a scenario where flow f is now served from queue lowQ, and is enqueued in queue highQ. At this point, if queue lowQ is non-empty, variable avoidHighQ may be set. While avoidHighQ remains true, the scheduler continues visiting new flows from queue lowQ. Once queue lowQ drains out, the scheduler looks in on queue highQ, and visits the flows in queue highQ in RR fashion (e.g., one packet per visit).

Algorithm 2 shares some functionality with Algorithm 1, but expands on the next flow selection functionality in a very beneficial way, as shown in Algorithm 2, below. Of course, other variations to this algorithm are possible without violating the various goals of the algorithm, such as smoother scheduling operation and fair treatment for flows.

---

Algorithm 2: Scheduling Algorithm Providing Smoother Service

```
Init: ∀f, cr_f = 0, avoidHighQ = false;
Select next flow:
    f = null; selectedLowQ = false;
    if (highQ.empty = true ∨ avoidHighQ = true then
        f = lowQ.dequeue( );
        selectedLowQ = true;
    else
        f = highQ.dequeue( );
    end if
    if f ≠ null then
        if selectedLowQ ∧ lowQ.empty = false then
            avoidHighQ = true;
        else
            avoidHighQ = false;
        end if
        cr_f = cr_f - L;
        if selectedLowQ = true then
            cr_f = cr_f + w_f;
        end if
        Serve L units from flow f
        Reprogram flow (f)
    end if
    Reprogram flow (g):
    if g is eligible then
        if cr_g > 0; then
            highQ.enqueue(g);
        else
            lowQ.enqueue(g);
        end if
    end if
```

---

The key in understanding why Algorithm 2, and the proposed scheduler, provides weight-proportional fair service may be described as follows, according to one embodiment. A flow f will remain in the queue highQ for a time proportional to its weight $w_f$ and inversely proportional to the amount of service it receives per visit (e.g., its packet size). Then the flow f will drop off of queue highQ, leading to denser visits to flows with higher weight or smaller packets, which will remain in queue highQ longer.

This may be formally proven by introducing the notion of the super-round. Assuming that all flows are continuously active, a super-round begins with all of the flows in queue lowQ, includes the visit to one or more flows, and ends up the next time instant when all flows fall into queue lowQ again. Observe that in each super-round, every active flow is visited at least twice: once from the front of queue lowQ, and once more from the front of queue highQ. In terms of aggregate service, a super-round is equivalent to a round in DRR.

In particular, if $s_f(m)$ is the service of flow f during the $m^{th}$ super-round and $cr_f(m)$ is flow f's service credit at the end of the super-round, then $s_f(m)=w_f+cr_f(m-1)-cr_f(m)$. The following may be proven by taking the sum $\Sigma_{n=1}^{m} s_f(n)$, and noting that $-L_{max}<cr_f<w_f$: in any interval $(t_1, t_2)$ that comprises exactly M super-rounds, the aggregate service assigned to flow f will be $(m-1)\cdot w_f-L_{max}<S_f(t_1, t_2)<(m+1)\cdot w_f+L_{max}$.

Some computer simulations were performed to evaluate the proposed scheduling algorithms. A scheduler was configured to arbitrate the access on a 100 G link. It is assumed that three persistent flows compete for the link, and set $L_{max}$=1500 B (bytes). The time of an $L_{max}$ packet on the link is 120 ns. In Example 1, all three flows have weight w=100·$L_{max}$, and each flow sends packets having a size of $L_{max}$. In Example 2, all three flows have weight w=100·$L_{max}$, with flows 0, 1, and 2 sending 1500 B, 512 B, and 64 B packets, respectively.

Figure 6A:
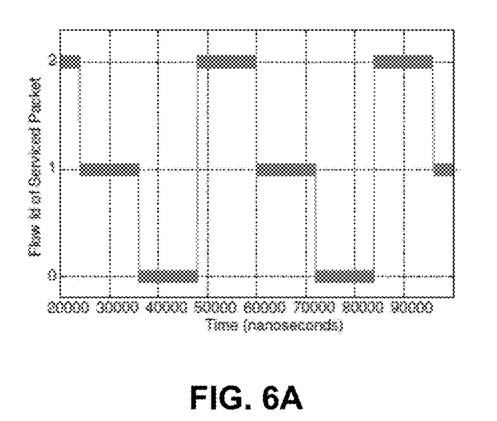
FIGS. 6A-6D show service times for various examples of service scheduling.
Figure 6B:
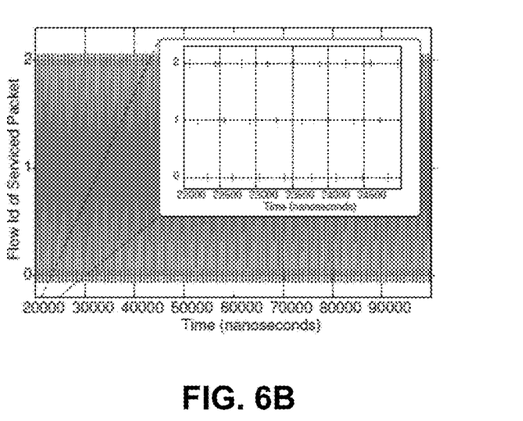

In all experiments, each algorithm assigned equal shares of the 100 G link to each of the flows. In FIGS. 6A and 6B, the service time-series are presented for Algorithm 1 and Algorithm 2 in Example 1. As can be seen, Algorithm 1 serves flows in bursts of w bytes, each burst lasting for about 100 ns to about 120 ns.

Figure 6C:
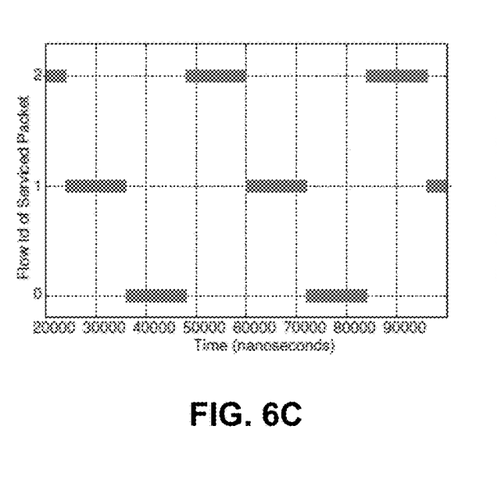
Figure 6D:
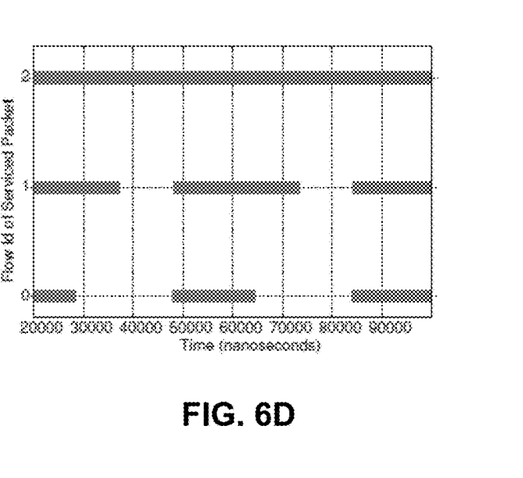

On the other hand, Algorithm 2 is much smoother. This is manifested in the inset of FIG. 6B, where the arbiter serves one packet from each flow in turn. FIGS. 6C and 6D present the corresponding results of Example 2. As shown, flow 0 sends larger packets than flow 1, which sends larger packets than flow 2. As can be seen in the figure, Algorithm 1 again serves flows in bursts of w bytes. The service from Algorithm 2 is smoother. On the other hand, Algorithm 2 commonly round-robins, sending one packet from each flow in turn. This is when all flows are active in queue highQ.

As can be seen, flow 0 drops out of queue highQ first, then the arbiter visits to flows 1 and 2 become denser. Next, the service credit of flow 1 becomes negative, leaving flow 2 alone in queue highQ to receive its fair share of service, until this flow also drops out of queue highQ and into queue lowQ, thus ending one super-round.

The proposed scheduler which makes use of Algorithm 2, described herein according to one embodiment, is a practical packet scheduler that scales to an arbitrarily large number of requestors. Following on from the success of DRR, the critical path of the proposed algorithm comprises less than a handful of low cost operations, therefore being readily implementable at ultra-fast link speeds. In terms of efficiency, the proposed algorithm seamlessly integrates smooth service, especially in a rather common case where flows' weights are approximately or substantially equal (e.g., within ±10% of one another), with weight proportional fairness.

Figure 7:
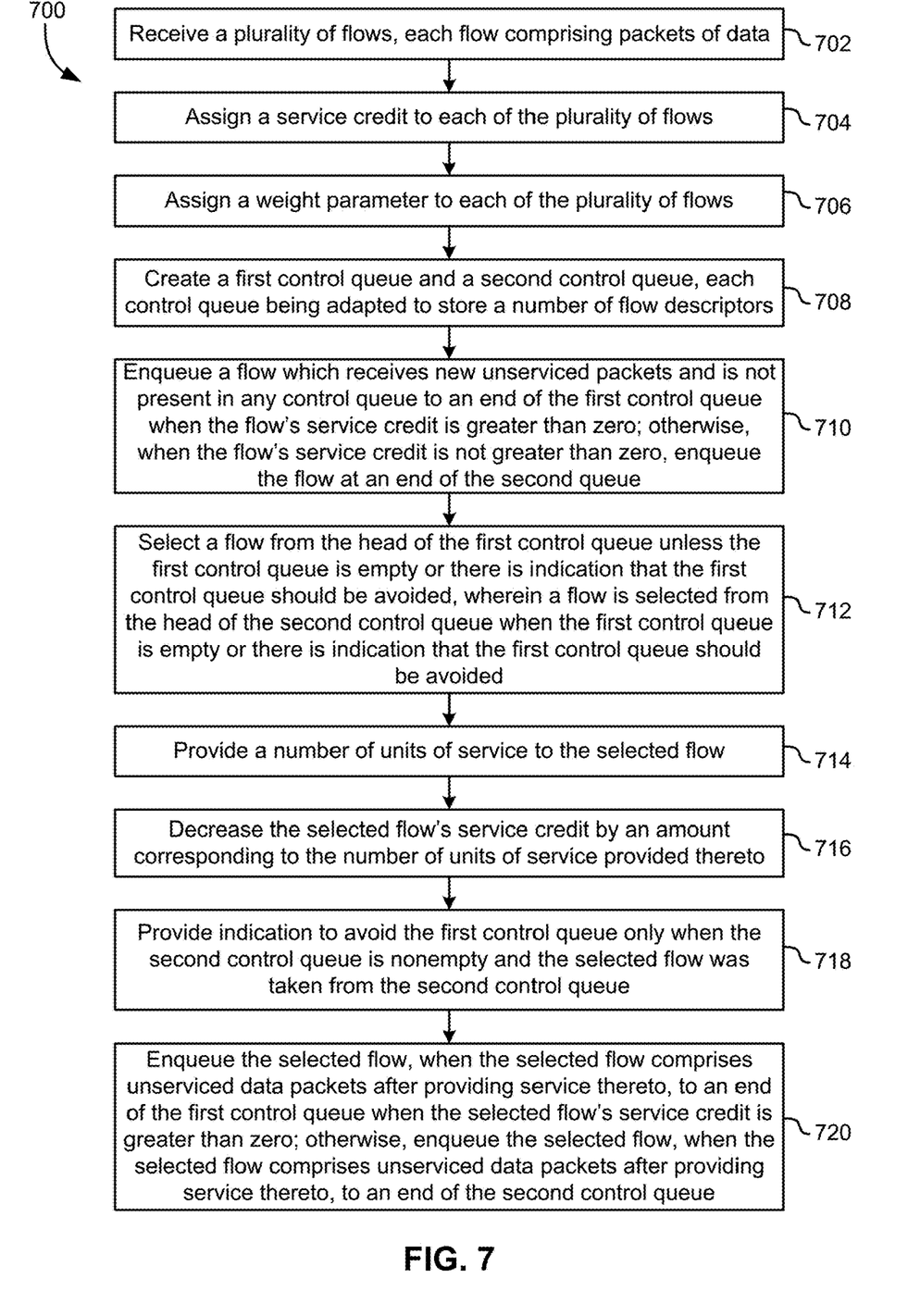
FIG. 7 shows a flowchart of a method, according to one embodiment.

Now referring to FIG. 7, a flowchart of a method 700 for scheduling service for flows is shown, according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a networking system, a switch, a router, a processor (such as a CPU, an ASIC, an FPGA, etc.), a server, etc., or any other suitable device or component of a networking system. Furthermore, the operations of method 700 may be embodied as hardware logic and/or software logic in any of the various embodiments described herein.

Any of the operations described below in relation to method 700 may be omitted and/or handled by another entity in relation to the execution of method 700. For example, flows may be received by a module separate from the scheduling module of a switch. In another example, service may be provided by a switching ASIC, while the algorithm may be executed by a separate processor, such as the CPU. Of course, any other division of operations, including operations not specifically described herein, may be made as would be understood by one of skill in the art upon reading the present descriptions.

As shown in FIG. 7, the method 700 may initiate with operation 702, where a plurality of flows from one or more sources is received. Each flow comprises packets of data. The data packets may adhere to any protocol known in the art, such as Ethernet, fiber channel over Ethernet (FCoE), any of various overlay protocols (e.g., Virtual eXtensible Local Area Network (VXLAN), Network Virtualization using Generic Routing Encapsulation (NVGRE), etc. Each flow may be a stream of data that is sent from a source (remote or local), with each source being connected to a network from which the stream of data is received. The flows may be remembered even when the stream of data stops or is interrupted, such that any parameters associated with the flow is reused when the stream of data is continued or re-established.

In operation 704, a service credit is assigned to each of the plurality of flows, such as $cr_f$ as described herein according to various embodiments, such that a plurality of service credits are stored for the plurality of flows, the service credits corresponding to the flows on a one-to-one basis. The initial service credit assigned to each flow may be zero, according to one embodiment. The service credits are not parameters that the administrator is allowed to configure, but instead are internal state-variables of the algorithm, according to one approach.

In operation 706, a weight parameter is assigned to each of the plurality of flows. Specifically, a weight parameter, such as $w_f$ as described herein according to various embodiments, may be assigned to each of the various flows, such that a plurality of weight parameters are stored for the plurality of flows, the weight parameters corresponding to the flows on a one-to-one basis. The weight parameters may be based on any known factor, such as a minimum bandwidth share of the particular flow (e.g., weights sum up to exactly 100), the relative urgency and/or importance of one request (flow) over another, etc.

In operation 708, a first control queue and a second control queue are created, formed, initialized and/or established in some manner. In one embodiment, the first control queue may be considered highQ, and the second control queue may be considered lowQ. Each control queue is adapted to store a number of flow descriptors (Flow IDs). The control queues store only Flow IDs of active flows, i.e., flows that have unserviced packets therein. Each such active flow is present in only one of the two available control queues, and only one instance of the flow is present at any time. Each control queue has a head and an end, with flows being selected and removed from the queue at the head, and flows being added to the queue at the end.

According to one embodiment, flows are not initially placed into any control queue, but are only placed into a control queue when they become active (or after being serviced). The control queue into which they are inserted depends on the value of the flow's service credit at this particular point in time. When a flow becomes active for the first time, it is inserted into the second control queue because at this point, the flow will have a service credit value of zero (a flow's service credit variable is initialized at zero).

In operation 710, a flow which receives new unserviced packets and is not present in any control queue (thus the flow is inactive) is enqueued to an end of the first control queue when the flow's service credit is greater than zero; otherwise, when the flow's service credit is not greater than zero (i.e., less than or equal to zero), the flow is enqueued at an end of the second queue. This operation handles the situation where a flow is inactive, but becomes active by having unserviced packets therein, but is not already accounted for in one of the control queues.

In operation 712, a flow is selected from the head of the first control queue unless the first control queue is empty or there is indication that the first control queue should be avoided. Furthermore, when the second control queue is non-empty, a flow is selected from the head of the second control queue when the first control queue is empty or there is indication that the first control queue should be avoided. The avoidance indication is described in more detail in operation 718.

According to one embodiment, when no flow has been selected in operation 712, the method 700 ends. Otherwise, the method 700 continues on to operation 714.

In operation 714, a number of units of service are provided to the selected flow, possibly by some module other than the scheduling module. However, the scheduling module may be informed about the amount of service provided to the selected flow, thereby allowing the scheduling module to make subsequent calculations.

In operation 716, the selected flow's service credit is decreased by an amount corresponding to the number of units of service provided thereto.

In one embodiment, the amount in which the selected flow's service credit is decreased, according to one embodiment, may be related to, based on, proportional to, or in any other way corresponding to the amount of service that the selected flow received prior to being reconsidered for placement in one of the control queues. In this way, flows which receive priority service have their respective service credit decreased in relation to the other flows (and possibly relegated to the second queue) such that other flows have a better chance of receiving service in comparison to the just serviced flow.

In a further embodiment, when the selected flow is taken from the second control queue, the selected flow's service credit may be increased by an amount corresponding to the selected flow's weight parameter after being decreased in operation 716. The amount in which the selected flow's service credit is increased, according to one embodiment, may be related to, based on, proportional to, or in any other way corresponding to the weight parameter assigned to the selected flow, such that higher weighted flows are afforded more priority to service when they were required to wait prior to receiving service in relation to the other flows.

In operation 718, indication to avoid the first control queue is provided only when the second control queue is nonempty and the selected flow was taken from the second control queue. Otherwise, the indication to avoid the first queue is not provided, such as when the selected flow was taken from the first control queue, the second control queue is empty, and many other operating conditions.

According to one embodiment, a parameter may be used to provide the indication, such as parameter avoidHighQ. In this way, the parameter may be a simple bit parameter, 0 or 1, and when the bit parameter is set to be true, e.g., avoidHighQ=true, the indication to avoid the first queue is provided. When the bit parameter is set to be false, e.g., avoidHighQ=false, the indication to avoid the first queue is not provided. Of course, any other mechanism for providing indication may be used, such as a message being sent, a locking mechanism which disallows some functionality, etc.

In operation 720, when the selected flow comprises unserviced data packets after providing service thereto and the selected flow's service credit is greater than the predetermined value (such as zero), the selected flow is enqueued to an end of the first control queue. Otherwise, when the selected flow comprises unserviced data packets after providing service thereto, the selected flow is enqueued to an end of the second control queue. The check on whether the selected flow comprises unserviced data packets after providing service thereto is made to ensure that the selected flow is eligible for additional service, or alternatively, that the selected flow is exhausted of packets and does not need to be placed in either of the control queues.

The method 700 may be performed, in various embodiments comprising all or some of the operations described in FIG. 7, in computer program products, other methods, logic, and/or systems, such as the networking systems described in relation to FIGS. 3-4, among others.

In one such embodiment, a computer program product for scheduling service for flows comprises a computer readable storage medium having program code embodied therewith, the program code readable/executable by a device to: select a flow from a head of a first control queue unless the first control queue is empty or there is indication that the first control queue should be avoided, wherein a flow is selected from a head of a second control queue when the first control queue is empty or there is indication that the first control queue should be avoided; provide a number of units of service to the selected flow; and decrease the selected flow's service credit by an amount corresponding to the number of units of service provided thereto. The device may be a networking system, a switch, a router, a processor (such as a CPU, an ASIC, an FPGA, etc.), a server, etc., or any other suitable device or component of a networking system capable of reading/executing program code.

In another embodiment, a system includes a processor (such as a CPU, an ASIC, a FPGA, a microprocessor, etc.) and logic integrated with and/or executable by the processor, the logic being adapted to: receive a plurality of flows from multiple sources, each flow comprising packets of data; assign a service credit to each of the plurality of flows; assign a weight parameter to each of the plurality of flows; select a flow from a head of a first control queue unless the first control queue is empty or there is indication that the first control queue should be avoided, wherein a flow is selected from a head of a second control queue when the first control queue is empty or there is indication that the first control queue should be avoided; provide a number of units of service to the selected flow; and decrease the selected flow's service credit by an amount corresponding to the number of units of service provided thereto. The logic may be embodied as hardware, as software, or a combination of hardware and software. Furthermore, the logic may be integrated with the processor as hardware and/or software, in some approaches. For example, the processor may be an ASIC that comprises all of the above-described logic as hardware logic of the ASIC.

In another embodiment, a system for scheduling servicing for flows includes a processor and logic integrated with and/or executable by the processor, the logic being adapted to: receive a plurality of flows from multiple sources, each flow comprising packets of data; assign a service credit to each of the plurality of flows; logic adapted to assign a weight parameter to each of the plurality of flows; place the plurality of flows into the second control queue initially according to an order in which each of the flows is received; select a flow from a head of a first control queue unless the first control queue is empty or there is indication that the first control queue should be avoided, wherein a flow is selected from a head of a second control queue when the first control queue is empty or there is indication that the first control queue should be avoided; decrease the selected flow's service credit by an amount corresponding to a number of units of service provided to the selected flow when the selected flow is taken from the first control queue; and increase the selected flow's service credit by an amount corresponding to the selected flow's weight parameter when the selected flow is taken from the second control queue.

Any of the embodiments described with respect to method 700 in FIG. 7 may be included in the computer program product and/or the systems described above, as would be understood by one of skill in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a computer readable storage medium having program code embodied therewith, wherein the computer readable storage medium is not a transitory signal per se, the embodied program code executable by a device to cause the device to perform a method comprising:
   receiving, by the device, a plurality of flows, each flow comprising packets of data;
   assigning, by the device, a service credit to each of the plurality of flows, each flow's service credit being defaulted to a predetermined numerical value when initially assigned and adjusted after providing service to a flow corresponding to the flow's service credit;
   assigning, by the device, a weight parameter as a numerical value to each of the plurality of flows;
   enqueuing, by the device, a flow which receives new unserviced packets and is not present in any control queue to an end of a first control queue when the flow's service credit is greater than zero;
   enqueuing, by the device, a flow which receives new unserviced packets and is not present in any control queue to an end of a second control queue when the flow's service credit is not greater than zero;
   selecting, by the device, a flow from a head of the first control queue unless the first control queue is empty or there is indication that the first control queue should be avoided, wherein a flow is selected from a head of the second control queue in response to a determination that the first control queue is empty or there is indication that the first control queue should be avoided;
   providing, by the device, a number of units of service to the selected flow; and
   decreasing, by the device, the selected flow's service credit by an amount corresponding to the number of units of service provided thereto.

2. The computer program product as recited in claim 1, wherein the embodied program code is further executable by the device to: create, by the device, the first control queue and the second control queue, each control queue being configured to store one or more flow descriptors; and increase, by the device, the selected flow's service credit by an amount corresponding to the selected flow's weight parameter in response to the selected flow being taken from the second control queue.

3. The computer program product as recited in claim 1, wherein the embodied program code is further executable by the device to: enqueue, by the device, a second flow which receives new unserviced packets and is not present in any control queue to an end of the first control queue in response to a determination that the second flow's service credit is greater than zero; and enqueue, by the device, the second flow at an end of the second control queue in response to a determination that the second flow's service credit is not greater than zero.

4. The computer program product as recited in claim 1, wherein the embodied program code is further executable by the device to provide, by the device, indication to avoid the first control queue only in response to a determination that the second control queue is nonempty and the selected flow was taken from the second control queue.

5. The computer program product as recited in claim 1, wherein the embodied program code is further executable by the device to: enqueue, by the device, the selected flow, in response to the selected flow comprising unserviced data packets after providing service thereto, to an end of the first control queue in response to a determination that the selected flow's service credit is greater than zero; and enqueue, by the device, the selected flow, in response to the selected flow comprising unserviced data packets after providing service thereto, to an end of the second control queue in response to a determination that the selected flow's service credit is not greater than zero.

6. A method comprising:
receiving a plurality of flows, each flow comprising packets of data;
assigning a service credit to each of the plurality of flows, each flow's service credit being defaulted to a predetermined numerical value when initially assigned and adjusted after providing service to a flow corresponding to the flow's service credit;
assigning a weight parameter as a numerical value to each of the plurality of flows;
enqueuing a flow which receives new unserviced packets and is not present in any control queue to an end of a first control queue when the flow's service credit is greater than zero;
enqueuing a flow which receives new unserviced packets and is not present in any control queue to an end of a second control queue when the flow's service credit is not greater than zero;
selecting a flow from a head of the first control queue unless the first control queue is empty or there is indication that the first control queue should be avoided, wherein a flow is selected from a head of the second control queue in response to a determination that the first control queue is empty or there is indication that the first control queue should be avoided;
providing a number of units of service to the selected flow; and
decreasing the selected flow's service credit by an amount corresponding to the number of units of service provided thereto.

7. The method as recited in claim 6, further comprising creating the first control queue and the second control queue, each control queue being configured to store one or more flow descriptors.

8. The method as recited in claim 6, further comprising: enqueuing a second flow which receives new unserviced packets and is not present in any control queue to an end of the first control queue in response to a determination that the second flow's service credit is greater than zero; and enqueuing the second flow at an end of the second control queue in response to a determination that the second flow's service credit is not greater than zero.

9. The method as recited in claim 6, further comprising increasing the selected flow's service credit by an amount corresponding to the selected flow's weight parameter in response to the selected flow being taken from the second control queue.

10. The method as recited in claim 6, further comprising providing indication to avoid the first control queue only in response to a determination that the second control queue is nonempty and the selected flow was taken from the second control queue.

11. The method as recited in claim 6, further comprising: enqueuing the selected flow to an end of the first control queue in response to the selected flow comprising unserviced data packets after providing service thereto and a determination that the selected flow's service credit is greater than zero; and enqueuing the selected flow to an end of the second control queue in response to the selected flow comprising unserviced data packets after providing service thereto and a determination that the selected flow's service credit is not greater than zero.

* * * * *